United States Patent [19]

Takeda

[11] Patent Number: 4,817,973
[45] Date of Patent: Apr. 4, 1989

[54] VEHICLE SUSPENSION ASSEMBLY

[75] Inventor: Youichi Takeda, Hiroshima, Japan

[73] Assignee: Mazda Motor Corporation, Hiroshima, Japan

[21] Appl. No.: 88,115

[22] Filed: Aug. 21, 1987

[30] Foreign Application Priority Data

Aug. 23, 1986 [JP] Japan .................. 61-128334[U]

[51] Int. Cl.⁴ .................. B60G 3/00; B62D 21/00
[52] U.S. Cl. .................. 280/781; 180/79; 280/688; 296/204
[58] Field of Search .................. 180/294, 79; 280/771, 280/779, 87.2, 660, 96.1, 688, 781; 296/203, 204

[56] References Cited

U.S. PATENT DOCUMENTS

| | | | |
|---|---|---|---|
| 2,413,264 | 12/1946 | Swennes et al. | 180/294 |
| 3,834,476 | 9/1974 | Donaldson | 180/294 |
| 4,231,444 | 11/1980 | Telesio | 180/294 |
| 4,392,545 | 7/1983 | Harasaki et al. | 180/294 |

FOREIGN PATENT DOCUMENTS 59-165268 11/1984 Japan .
59-192407 12/1984 Japan .

Primary Examiner—Richard A. Bertsch
Attorney, Agent, or Firm—Fleit, Jacobson, Cohn & Price

[57] ABSTRACT

A suspension assembly or mechanism for a vehicle consisting of a pair of suspension arms connected with steerable wheels of a vehicle. A suspension support member carries the suspension arms and is made up of a transverse member integrally connected with a pair of longitudinal members, one on each side of the vehicle. Rubber mounts hold the suspension support member onto the vehicle frame. Rubber mounts pivotally support the suspension arms, on the support member. A steering gear mechanism contained in a housing is carried on reinforcing members that are easily removably connected at one end with the transverse member, and easily removably connected at their other ends with the longitudinal members. The housing is fixed to the reinforcing member and can be easily detached and repaired. The support member is rigidly reinforced.

10 Claims, 4 Drawing Sheets

VEHICLE SUSPENSION ASSEMBLY

BACKGROUND OF THE INVENTION

1. Field of the Invention

The present invention relates to a front end suspension assembly, for a vehicle and more specifically to a reinforced suspension assembly that allows easy access to the steering mechanism in the event repairs are necessary.

2. Description of the Prior Art

A front steering mechanism for a vehicle is known from Japanese Utility Model Public Disclosure No. 59-165268 filed on Apr. 21, 1983, and laid open to the public on Nov. 6, 1984. As disclosed in this Japanese Utility Model Application, the front steering mechanism includes a housing mounted on a portion of the front end suspension assembly of the vehicle by a clamp member. The front end suspension assembly, in turn, is mounted on a front frame member. This is shown in FIGS. 7 and 8. As illustrated, the suspension assembly comprises an L-shaped suspension support member 3 including a box-like transverse member 1 and a longitudinal member 2. A pair of rubber mounts 8, to restrain vibration connect member 2 with and below a longitudinal beam 9 of the vehicle frame. Suspension lower arm 4 is swingably connected at one end by rubber mount R1 with the longitudinal member 2 to allow pivoting in the vertical direction. The other end of arm 4 is connected with a wheel support member 5 through a joint member 6. An assist link 7 is connected at one end with the longitudinal member 2 by a conventional mount R2 and at its other end with a middle portion of the suspension lower arm 4. Steering housing 12 having a conventional steering gear mechanism within it is mounted on a vertical surface 1a of the suspension support member 3 by a C clamp member 14 bolted top and bottom by bolts 13. The steering gear mechanism moves transversely a tie rod 10 connected with a knuckle arm 5a. In this conventional front suspension assembly as described above, the area of the vertical surface 1a of the suspension support member 3 is relatively small, and, therefore it is difficult to mount the housing member 12 on this vertical surface 1a. Moreover, it is difficult to detach the housing member 12 from the suspension support member 3 because of the low clearance, see in this regard the location of the engine lower surface relative to the transverse member 1 (FIG. 8). The working space available for detaching the bolts 13 from the vertical surface 1a is small or narrow. Accordingly, whenever it is necessary to repair the steering mechanism, one must first detach the suspension support member 3 from the side frame 9 of the body, in order to gain access to and repair the steering mechanism. A large-scale work or major job must be undertaken resulting in a large and undesirable repair bill to the owner of the vehicle.

SUMMARY OF THE INVENTION

It is, therefore, the principal object of the invention to provide a front suspension assembly which enables repairs to the steering mechanism to be carried out efficiently, effectively, and above all, at a substantially reduced cost to the vehicle owner.

It is another object of the present invention to provide a front suspension assembly in which the suspension support member including the transverse member and the longitudinal member are reinforced and bound into a more efficacious rigid structure.

The above and other objects of the present invention are accomplished by a novel suspension assembly including a suspension support member including a transverse member and longitudinal member connected with the frame of a vehicle, a suspension arm carried by the longitudinal member and connected with a steerable or dirigible wheel.

The suspension assembly of the present invention further includes a reinforcing member easily and quickly detachably connected at one end with the transverse member and at its other end easily and quickly detachably connected with the longitudinal member to form a rigid triangular structure. The suspension assembly of the present invention further includes provision for supporting the housing member having a rack and pinion gear mechanism and for connecting the housing member with the detachable and removable reinforcing member.

In accordance with the teachings of the present invention, the reinforcing member affords a large supporting and connecting area for the housing member and is easily and quickly detachably connected with the suspension support member. Because the housing member is supported on the upper surface of the reinforcing member and connected only to the reinforcing member, detaching the reinforcing member from the suspension support member, gives ready access to the steering mechanism and enables repairs to be made to the steering mechanism readily and without difficulty. To the vehicle owner this is of paramount importance and great significance as the time and difficulty of repairing the steering mechanism will be substantially lowered and the owner will be presented with a substantially reduced repair bill.

DETAILED DESCRIPTION OF THE PREFERRED EMBODIMENT

Figure 1:
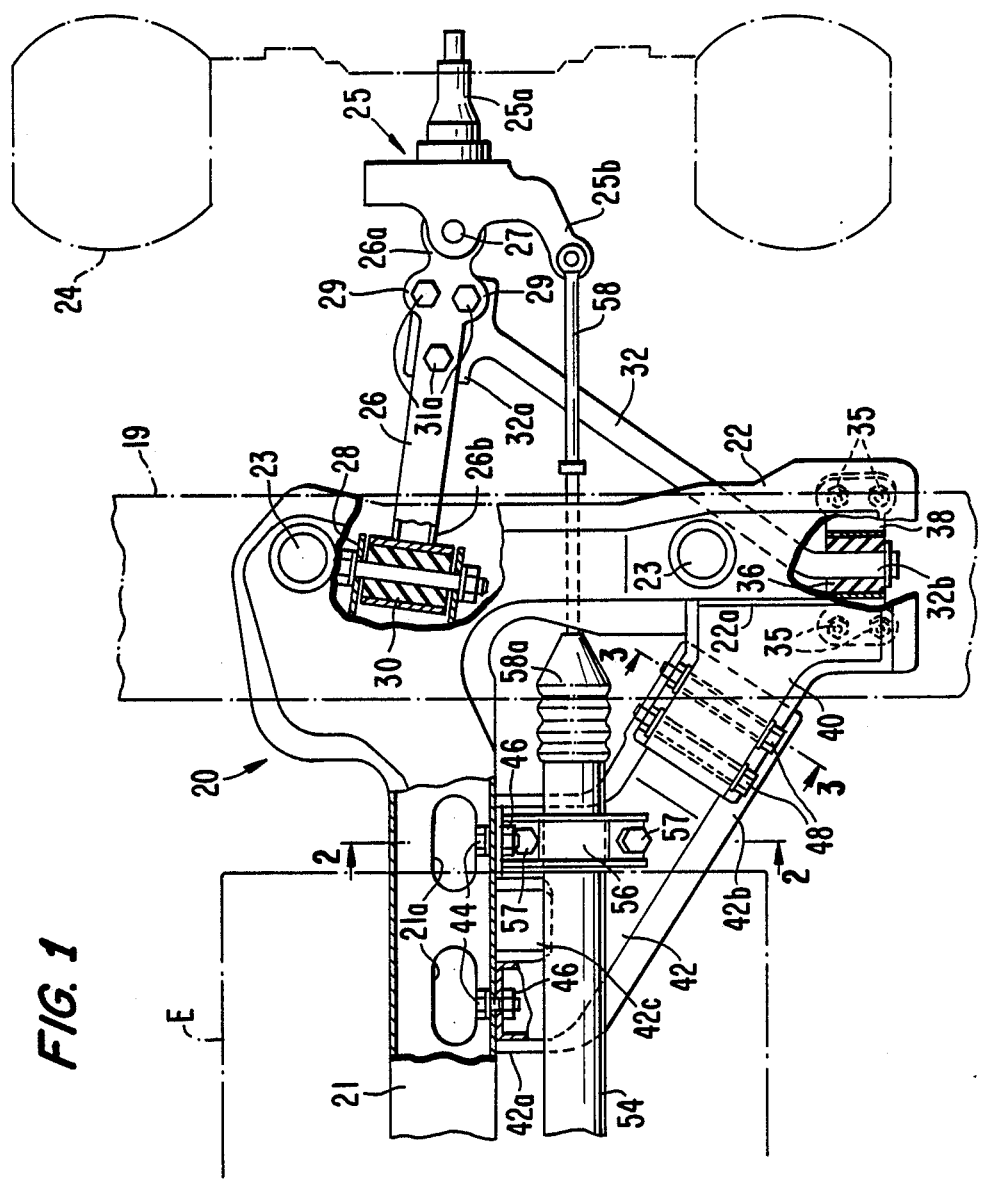
FIG. 1 is a partially sectional plan view of a suspension assembly in accordance with the present invention.

Now referring to FIG. 1, there is shown a right front suspension assembly for a vehicle including a suspension support member 20 composed of a box-like transverse member 21 integrally joined with a box-like longitudinal member 22. The left front suspension is a mirror image of the right front suspension. The suspension support member 20 is connected with a longitudinally extending side frame 19 of the vehicle through conventional rubber mounts 23. One end 26b of a suspension lower arm 26 is swingably carried in the vertical direction by means of clamp member 28 attached on a lower surface of the longitudinal member 22 through the means of a conventional rubber mount 30. The other end 26a of the suspension arm 26 is pivotally or rotatably connected by pin 27 with a wheel supporting member 25 that carries wheel mount 25a onto which wheel 24 is mounted and carried.

A pair of bosses 29 are formed at a mid-portion of the suspension lower arm 26. Bosses 29 project horizontally and provide space for connecting by bolts 11a an enlarged end 32a of an assist link 32.

The main portion of the assist link 32 is of a substantially circular cross section and defines a moderated L-shaped configuration. One end 32b, of link 32 is mounted or connected to the lower surface of member 22 to swing or pivot in the vertical direction relative to the longitudinal member 22. The mounting or connection is by means of clamp member 38 attached by bolts 35 to member 22 and rubber mount 36 connected to clamp 38 and holding end 32b in a conventional way. The other end 32a of the assist link 32 is formed as a plate to provide a connection to the suspension lower arm 26 by three bolts 31a.

Figure 4:
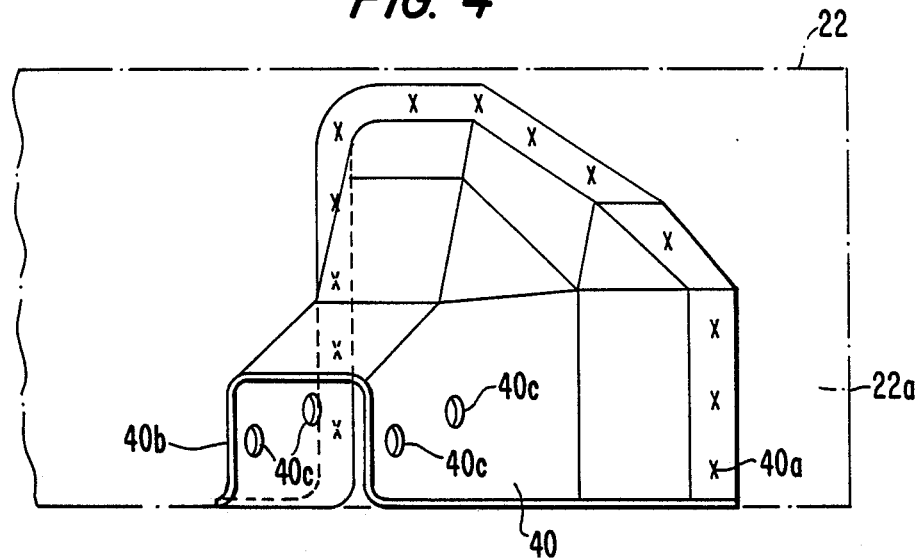
FIG. 4 is a perspective view of a bracket member attached to the longitudinal member.

A bracket member 40 is spot welded at 40a to the vertical surface 22a of the longitudinal member 22, as shown in FIG. 4, near the free end of member 22 where the end 32b of the assist link 32 is connected. The bracket member 40 is of a hat-shaped configuration, U shaped in vertical section open at the bottom and tapering from a large end attached to surface 22a to a small free end 40b remote from surface 22a. Pairs of aligned holes 40c are provided on opposite vertical sides of bracket 40.

A reinforcing member or strut 42 is connected at one end 42a with the transverse member 21 and at its other end 42b with the bracket 40. The end 42a of the reinforce member 42 is of a branch-shaped configuration. A hole or space 42c is defined between the two branches of end 42a and serves to provide service access to the engine E. More particularly, space 42c provides access to the drain plug of the oilpan.

Figure 2:
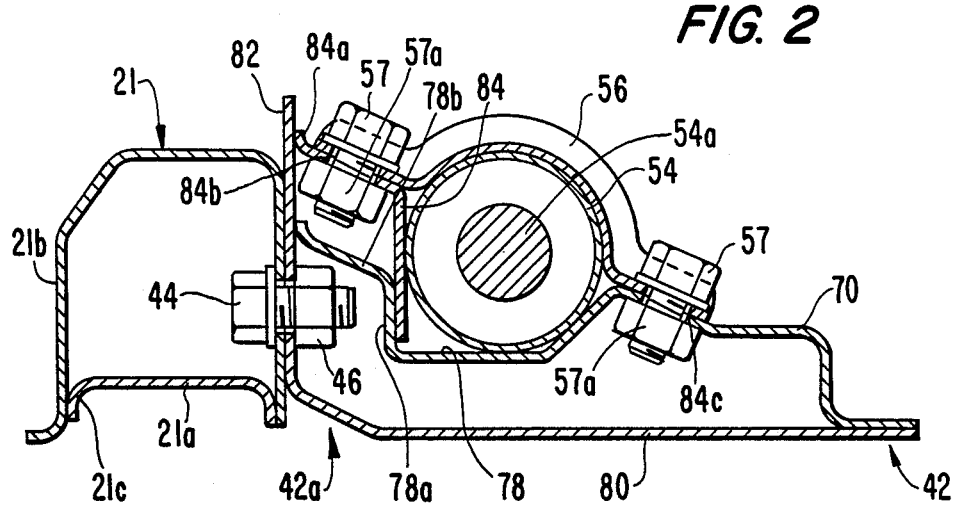
FIG. 2 is a sectional view taken along line 2—2 of FIG. 1.
Figure 6:
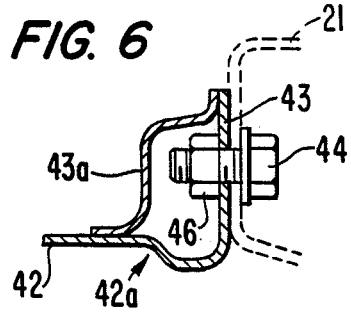
FIG. 6 is a sectional view taken along line 6—6 of FIG. 5.
Figure 7:
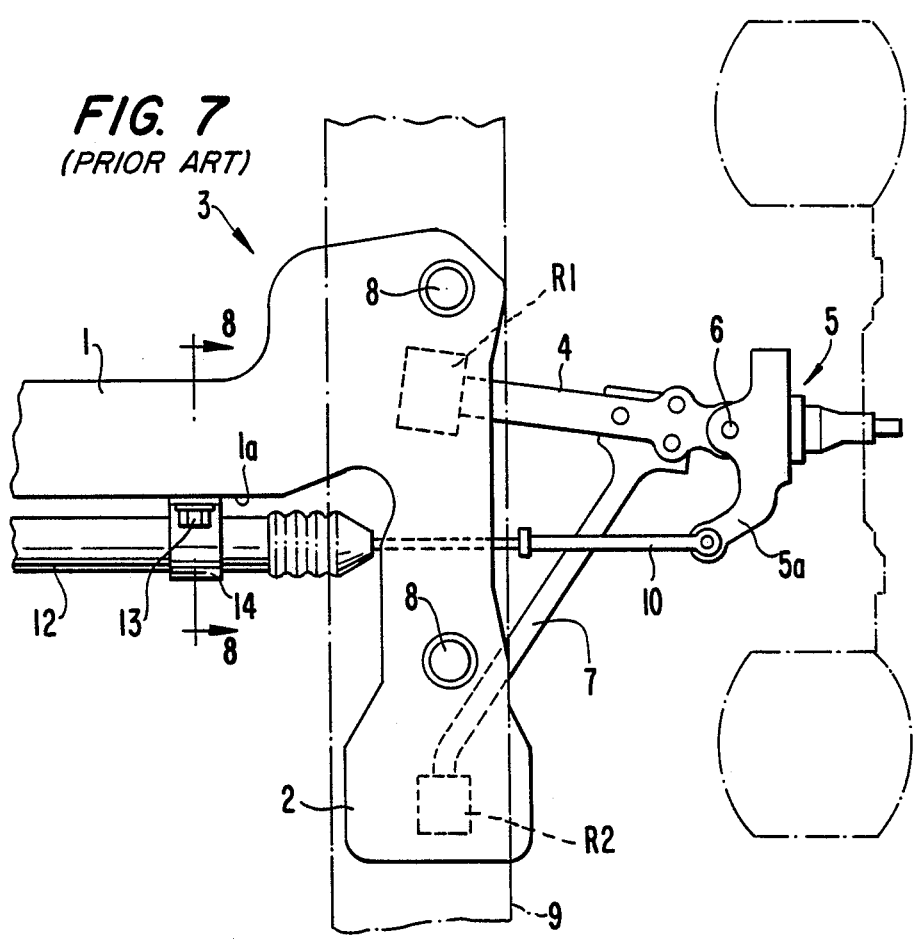
FIG. 7 is a partially sectional plan view of a known, conventional suspension assembly.
Figure 8:
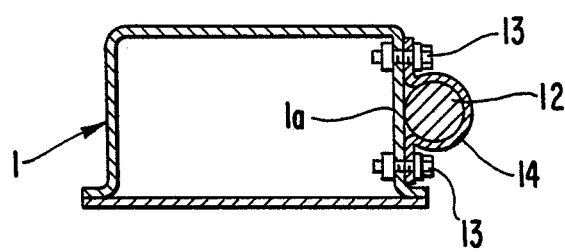
FIG. 8 is a sectional view taken along line 8—8 of FIG. 7.

FIGS. 1 and 2 show how the branched end 42a is connected with the transverse member 21. The transverse member 21 is box-like as mentioned and consists of an inverted U channel 21b closed at its bottom by a plate 21c with downwardly turned edges welded to the depending legs of channel 21b. The reinforcing member 42 is connected with the proximate vertical face of the transverse member 21 by means of nuts 46 welded to member 42 and bolts 44. Access holes 21a in plate 21c provide access to bolts 44 from within transverse member 21. The left branch of end 42a of member 42 as viewed in FIG. 1 is shown in FIG. 6. The end 42a terminates in a vertical plate 43. A narrow cover plate 43a is welded to plate 43 top and bottom.

Figure 5:
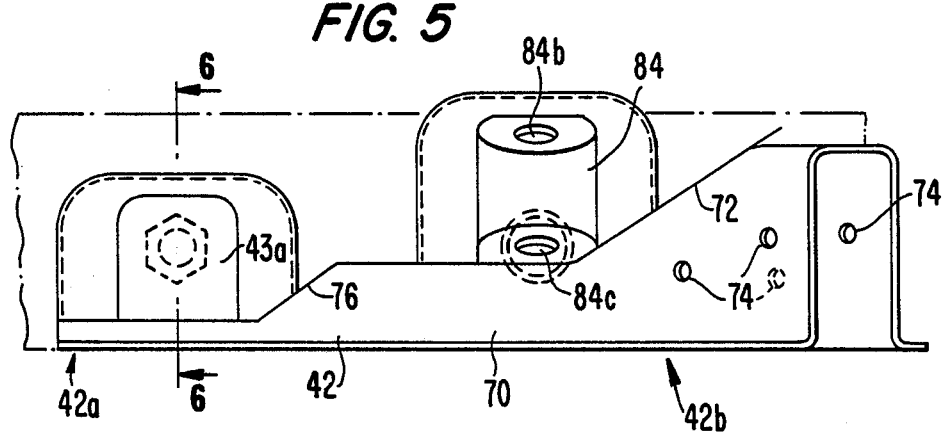
FIG. 5 is a perspective view of the reinforcing member of the present invention.

Reinforcing member 42 is shown in perspective in FIG. 5 and consists of an inverted U-channel part 70 that tapers upwardly at 72 to define end 42b to be attached to the smaller free end 40b of the bracket 40. Bolt holes 74, matching and registering with bolt holes 40c, are defined in end 42b.

The portion of member 42 nearest transverse member 21 is tapered downwardly at 76 and thereafter bifurcated to define the two branches of end 42a. A saddle 78 extends across member 42 parallel to member 21, the access hole 42c dividing the saddle 78 into two parts, each part being formed on one of the two branches of end 42a.

The right branch of end 42a as viewed in FIG. 1 is best seen in FIG. 2. As will be evident, the channel 70 defining saddle 78 is bent into a narrowed vertical portion at 78a and then bent again to define the narrowed final portion 78b extending toward the transverse member 21. A plate 80 is welded to and closes off the channel 70 throughout its length. At its end proximate member 21, plate 80 is bifurcated with one leg forming vertical plate 43 and the other leg forming vertical plate 82. Plate 82 is bolted to the proximate vertical face of the member 21 by bolt 44 and nut 46 which is exposed on either side of narrowed portions 78a and 78b. The end of bent portion 78b is welded to plate 82. An access hole 21a provides access to bolt 44. A plate 84 is welded to vertical portion 78a and extends upwardly to a point spaced above the bend between portions 78a and 78b and there is bent so that its top end 84a extends parallel with portion 78b and is welded to plate 82. A bolt hole 84b is defined in top end 84a. A bolt hole 84c is defined in channel 70 in the right branch of end 42a on the opposite side of saddle 78.

A C-shaped clamp 56 clamps housing member 54 containing the steering mechanism generally designated as 54a. Clamp 56 has bolt holes defined in its ends registering and matching with bolt holes 84b and 84c. Bolts 57 with nuts 57a secure clamp 56 to top end 84a and the portion of channel 70 on the opposite side of saddle 78.

Figure 3:
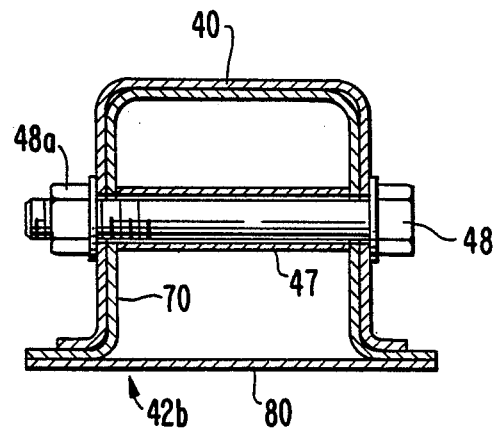
FIG. 3 is a sectional view taken along line 3—3 of FIG. 1.

The other end 42b of reinforcing member 42 is connected to the smaller free end of bracket 40 by bolts 48 and nuts 48a as shown in FIG. 3. The connection is made by inserting end 42b into the free end of bracket 40 with the respective bolt holes aligned, insert bolts 48 in sleeves 47 welded to the inside of channel 70, threading through nuts 48a welded to the surface of bracket 40. Because of the vertical orientation, connecting and disconnecting end 42b can be easily and readily effected.

As described above, the transverse member 21 and the longitudinal member 22 are connected together by the bracket 40 and reinforcing member 42. Therefore, it will be understood that the suspension support member 20 is an especially rigid and durable construction.

An end portion of the rack gear in the housing member 54 is connected with one end of tie rod 58. A rubber diaphragm or boot seal 58a protects the interior of member 54. The tie rod 58 is connected at its other end with a knuckle arm 25a of a knuckle member 25 pivotally or rotatably connected with the suspension lower arm 26 by pivot pin 27. When the vehicle steering wheel, not shown in the drawings, is steered or turned, the steering force is transmitted to the knuckle arm 25a through the steering gear mechanism in housing 54 and tie rod 58. The knuckle member 25 pivots or rotates around the pin 27, and the front wheel 24 changes direction in response to this motion of member 25. As mentioned, the left front suspension is a mirror image of the right and therefore, a second longitudinal member 22 and second reinforcing member 42 is present. Likewise, the two front wheels are turned together and are similary mounted.

As described above, the housing member 54 is disposed on the saddle 78 and attached only to the reinforcing member 42 by the clamp member 56. The connecting area for the housing member 54 is relatively large. It will therefore be understood that the work efficiency for attaching the housing member 54 is better. Moreover, each branch of end 42a of reinforcing member 42 can be easily and readily detached from the transverse member 21. Also, end 42b can be easily and readily detached from the bracket 40. Thus, repairing the steering mechanism simply becomes a matter of detaching the ends 42a and 42b of member 42, dropping down, and removing clamp 56 to gain access to housing member 54 and the steering mechanism. It will therefore be understood that the work for detaching the housing member 54 is greatly facilitated and repair of the steering mechanism can take place quickly at lower cost to the vehicle owner.

In relation to this aspect, according to the present invention, as the housing member 54 carried by member 42 can be attached easily to the suspension support member 20 and detached easily from the suspension support member 20, repair of the steering mechanism can be effected easily. Moreover, as the longitudinal member 22 and the transverse member 21 of the suspension support member 20 are connected to each other by the bracket 40 and reinforcing member 42, the suspension member 20 is more rigidly constituted.

Although the invention has been described with reference to a preferred embodiment, changes will appear evident to those skilled in the art which do not depart from the inventive concept. Such changes are deemed to fall within the purview of the claims.

What is claimed is:

1. A suspension assembly for a vehicle comprising:
   (a) a suspension support member including a transverse member extending in the transverse direction of the vehicle integrally connected with a longitudinal member extending in the longitudinal direction of the vehicle;
   (b) a vehicle frame;
   (c) mounting means for mounting said suspension support member on said vehicle frame;
   (d) a suspension arm rotatably connected with said suspension support member for holding a steerable wheel of a vehicle;
   (e) a housing member for holding a steering gear mechanism;
   (f) an elongated reinforcing means including a bracket fixed to the longitudinal member and a reinforcing member easily removably connected at one end with said transverse member, said bracket and the other end of said reinforcing member being overlapped and easily removably connected together such that release of said reinforcing member from said bracket enables said reinforcing member to be moved vertically downwardly for ease of removal and repair of the steering gear mechanism; and
   (g) clamping means for clamping said housing member to said reinforcing means.

2. A suspension assembly according to claim 1 wherein said suspension support member includes a longitudinal member integrally connected each opposite end of said transverse member.

3. A suspension assembly in accordance with claim 1 in which said bracket member is of hat-shaped configuration.

4. A suspension assembly in accordance with claim 3 in which said bracket and reinforcing means are connected by means of bolts which pass through matching bolt holes defined in juxtaposed vertical walls.

5. A suspension assembly in accordance with claim 1 in which said reinforcing means defines a saddle to receive said housing member.

6. A suspension assembly in accordance with claim 1 in which said reinforcing means is connected with said transverse member by means of bolts.

7. A suspension member in accordance with claim 1 in which said reinforcing means includes a recess portion whereon said housing member is mounted.

8. A suspension assembly in accordance with claim 1 in which said reinforcing means is bifurcated at the end connected with said transverse member.

9. A suspension assembly in accordance with claim 1 in which said suspension support member is L-shaped and said reinforcing means is connected to the free end of said longitudinal member.

10. A suspension assembly in accordance with claim 1 in which said reinforcing means extends in an oblique direction relative to the vehicle orientation and defines a triangular rigid structure with said transverse and longitudinal members.

* * * * *